United States Patent [19]

Morino et al.

[11] Patent Number: 4,805,136
[45] Date of Patent: Feb. 14, 1989

[54] PROGRAM PROTECTION IN A PROGRAMMABLE ELECTRONIC CALCULATOR

[75] Inventors: Masuaki Morino, Soraku; Yoshiyuki Fujikawa; Isamu Haneda, both of Nara; Tetsuo Myoi, Soraku, all of Japan

[73] Assignee: Sharp Kabushiki Kaisha, Osaka, Japan

[21] Appl. No.: 438,502

[22] Filed: Nov. 2, 1982

[30] Foreign Application Priority Data

Nov. 9, 1981 [JP] Japan ................ 56-180217

[51] Int. Cl.⁴ ............................................. G06F 12/14
[52] U.S. Cl. ................................................... 364/900
[58] Field of Search ... 364/200 MS File, 900 MS File

[56] References Cited

U.S. PATENT DOCUMENTS 3,855,461 12/1974 Stockwell ............... 364/200 X
4,012,725  3/1977 Spangler et al. ........ 364/200
4,118,789 10/1978 Casto et al. ............. 364/900
4,245,308  1/1981 Hirschman et al. ...... 364/200
4,366,553 12/1982 Spangler et al. ........ 364/900

Primary Examiner—Raulfe B. Zache
Attorney, Agent, or Firm—Birch, Stewart, Kolasch & Birch

[57] ABSTRACT

A programmable electronic calculator operates in a programming mode, wherein a desired optional program is introduced into the programmable electronic calculator, or in a run mode wherein the stored program is executed. The introduced optional program is stored in a read/write memory (RAM). A mode selection switch is provided on a keyboard for selectively placing the programmable electronic calculator in the run mode or the programming mode. When a lock command is introduced through the keyboard, the mode selection switch is disabled so that the programmable electronic calculator will not be placed in the programming mode, thereby protecting the optional program stored in the read/write memory (RAM) from being unintentionally erased.

5 Claims, 4 Drawing Sheets

PROGRAM PROTECTION IN A PROGRAMMABLE ELECTRONIC CALCULATOR

BACKGROUND AND SUMMARY OF THE INVENTION

The present invention relates to a programmable electronic calculator and, more particularly, to a portable, programmable electronic calculator or a portable, personal computer.

In such an electronic calculator, an optional program can be set in an electronic calculator through the use of a key input panel. More specifically, an operator typically introduces a desired program into an electronic calculator through the key input panel. The thus introduced program is stored in a semiconductor memory and the program is read out at a desired time to conduct the programmed operation. The semiconductor memory is associated with a backup battery so that the program stored in the semiconductor memory is not erased even when a main power supply is interrupted.

However, in the conventional programmable electronic calculator, there is a possibility that the program may be unintentionally changed or erased due to an erroneous operation conducted at the key input panel.

Accordingly, an object of the present invention is to provide a novel system in a programmable electronic calculator for preventing an unintentional change of an optional program.

Another object of the present invention is to provide a lock system in a programmable electronic calculator, which functions to preclude the programmable electronic calculator from being placed in a program mode.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an optional program is introduced into and stored in a read/write memory (random access memory) when a programmable electronic calculator is placed in a programming mode. The thus stored program is executed at a desired time when the programmable electronic calculator is placed in a run mode. The mode selection between the programming mode and the run mode is conducted through the use of a mode selection key. When a lock command is introduced into the programmable electronic calculator, the programmable electronic calculator is not placed in the programming mode even when the mode selection key is operated. That is, the programmable electronic calculator is not placed in the programming mode even when the mode selection key is erroneously operated while the programmable electronic calculator is in the run mode, thereby protecting the optional program stored in the read/write memory from being unintentionally changed or erased.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
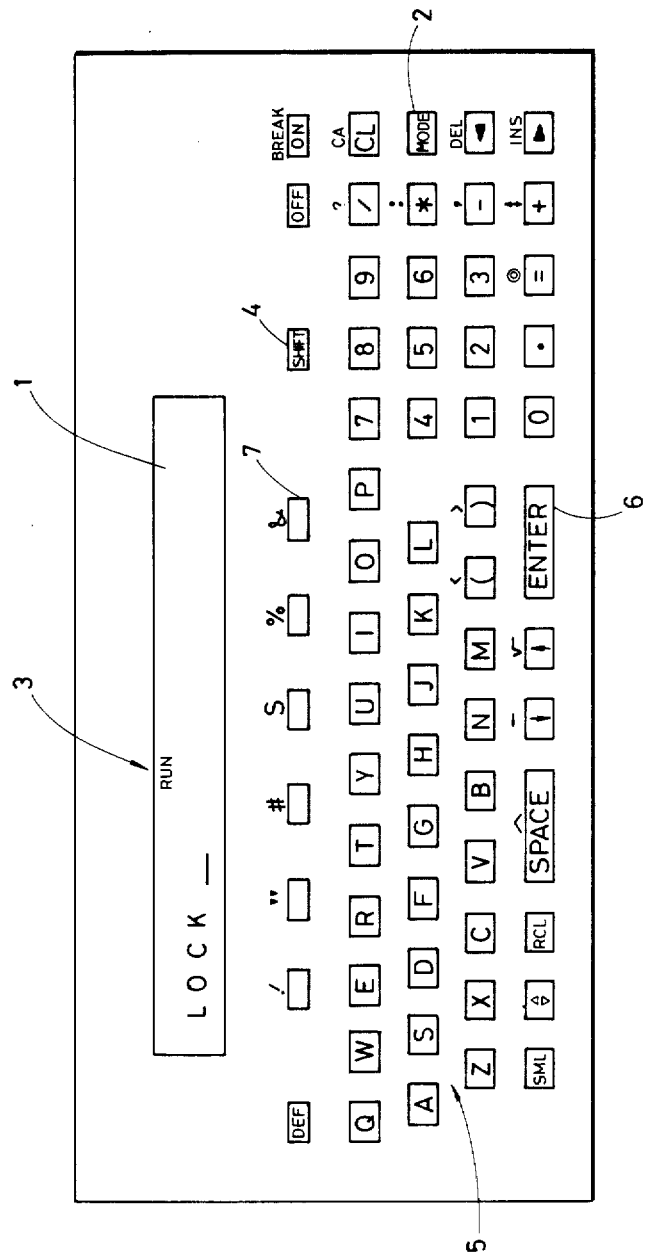
FIG. 1 is a plan view of an embodiment of a programmable electronic calculator according to the present invention.

A programmable electronic calculator according to the invention, as shown in FIG. 1, includes a display panel 1 such as a liquid crystal display panel of the dot matrix type. A mode selection key 2 is provided for selectively placing the programmable electronic calculator in a run mode (normal operational mode) and a programming mode. When the mode selection key 2 is actuated in the run mode, the programmable electronic calculator is placed in the programming mode. When the mode selection key 2 is actuated in the programming mode, the programmable electronic calculator is placed in the run mode. The thus selected mode is displayed on the display panel 1 through the use of a symbol segment 3.

A shift key 4 is provided for placing the programmable electronic calculator in a reserve mode in combination with the mode selection key 2. When the mode selection key 2 is actuated immediately after the actuation of the shift key 4, the programmable electronic calculator is placed in the reserve mode, wherein a specific command of plural characters can be assigned to any one of reserve keys 7. Character keys 5 are provided for introducing various commands into the programmable electronic calculator. An enter key 6 controls the execution of the operation. That is, when the enter key 6 is actuated after a desired command is introduced through the use of the character keys 5, the program related to the introduced command is executed.

Figure 2:
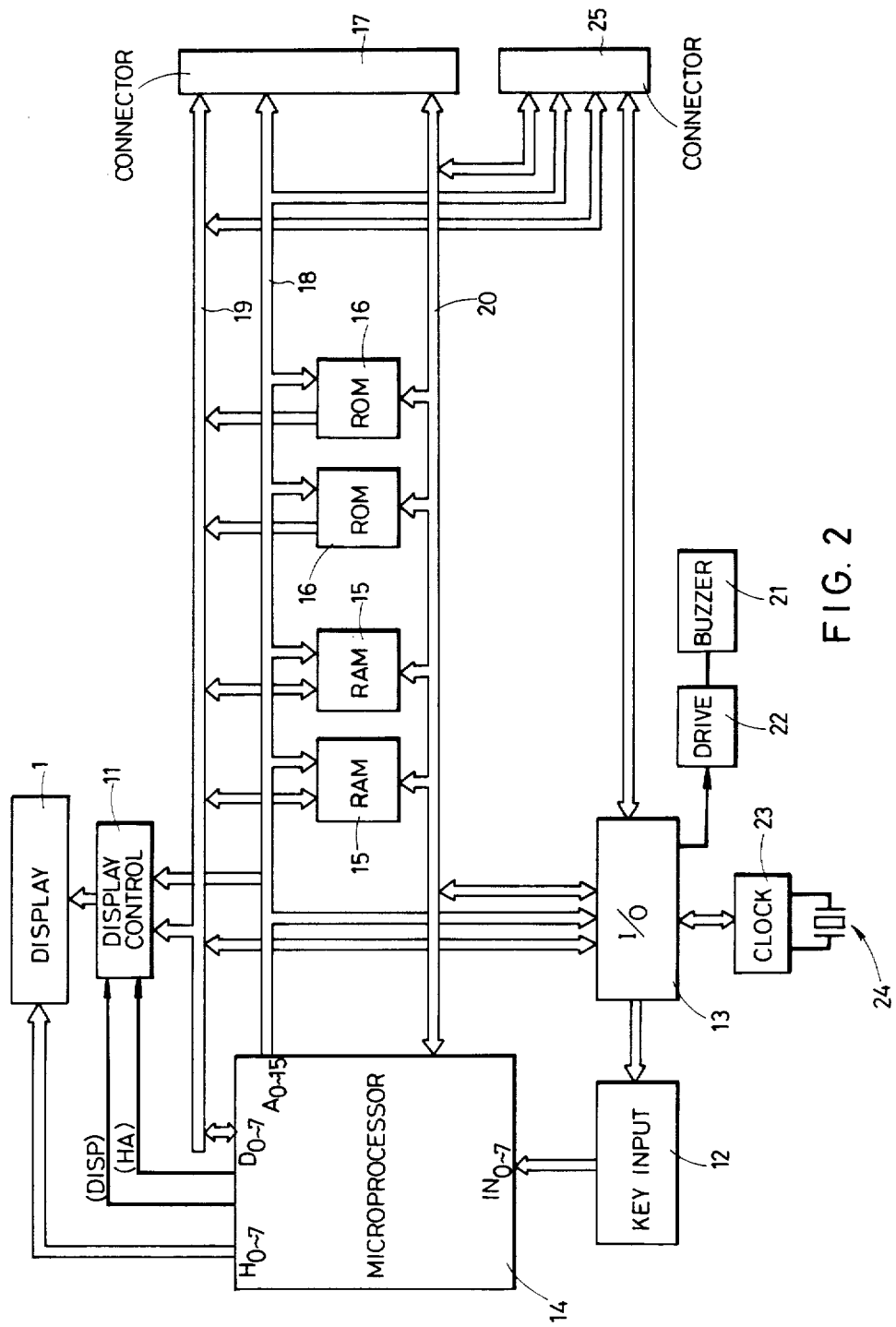
FIG. 2 is a schematic block diagram of the programmable electronic calculator of FIG. 1.

As shown in FIG. 2, the programmable electronic calculator includes a display control circuit 11 for controlling the display on the display panel 1 inclusive of the numeral display, the character display and the symbol display (3). A key input circuit 12 is associated with various keys provided on the input panel of the programmable electronic calculator. The key input circuit 12 receives a key strobe signal developed from an input/output port 13, and the key input circuit 12 develops a key return signal which is applied to a microprocessor unit 14. The programmable electronic calculator further includes read/write memories (RAM) 15 which function as various registers and flags for storing various data inclusive of optional programs. Read only memories (ROM) 16 store control programs and interpreters for executing standard programs. A connector 17 is provided for connecting the programmable electronic calculator to outer memories, if required.

As further illustrated in FIG. 2, the read/write memories (RAM) 15, the read only memories (ROM) 16 and the outer memories are connected to an address bus 18, a data bus 19 and a control bus 20. The above-mentioned input/output port 13 is also connected to the address bus 18, the data bus 19 and the control bus 20, and functions as an interface for the microprocessor unit 14.

The programmable electronic calculator further includes a buzzer 21 which is activated by a driver circuit 22. A clock circuit 23 associated with a crystal oscillator 24 is provided. The above-mentioned input/output port 13 further functions to control signal transmission between the main control circuit and the clock circuit 23 and the driver circuit 22. The clock circuit 23 stores the time information data. Another connector 25 is provided for connecting the programmable electronic calculator to optional units such as a data recorder, a printer and a floppy disc.

The microprocessor unit 14 develops a synchronization signal HA and an ON/OFF signal DISD, schematically shown in FIG. 2, which are applied to the display control circuit 11. The microprocessor unit 14 further develops back plate signals $H_0$ through $H_7$ which are applied to the display panel 1. The display control circuit 11 includes a display memory (not shown), each bit of the display memory corresponding to each segment included in the display panel 1. That is, a desired pattern is displayed on the display panel 1 when a desired bit pattern is written into the display memory included in the display control circuit 11.

Figure 3:
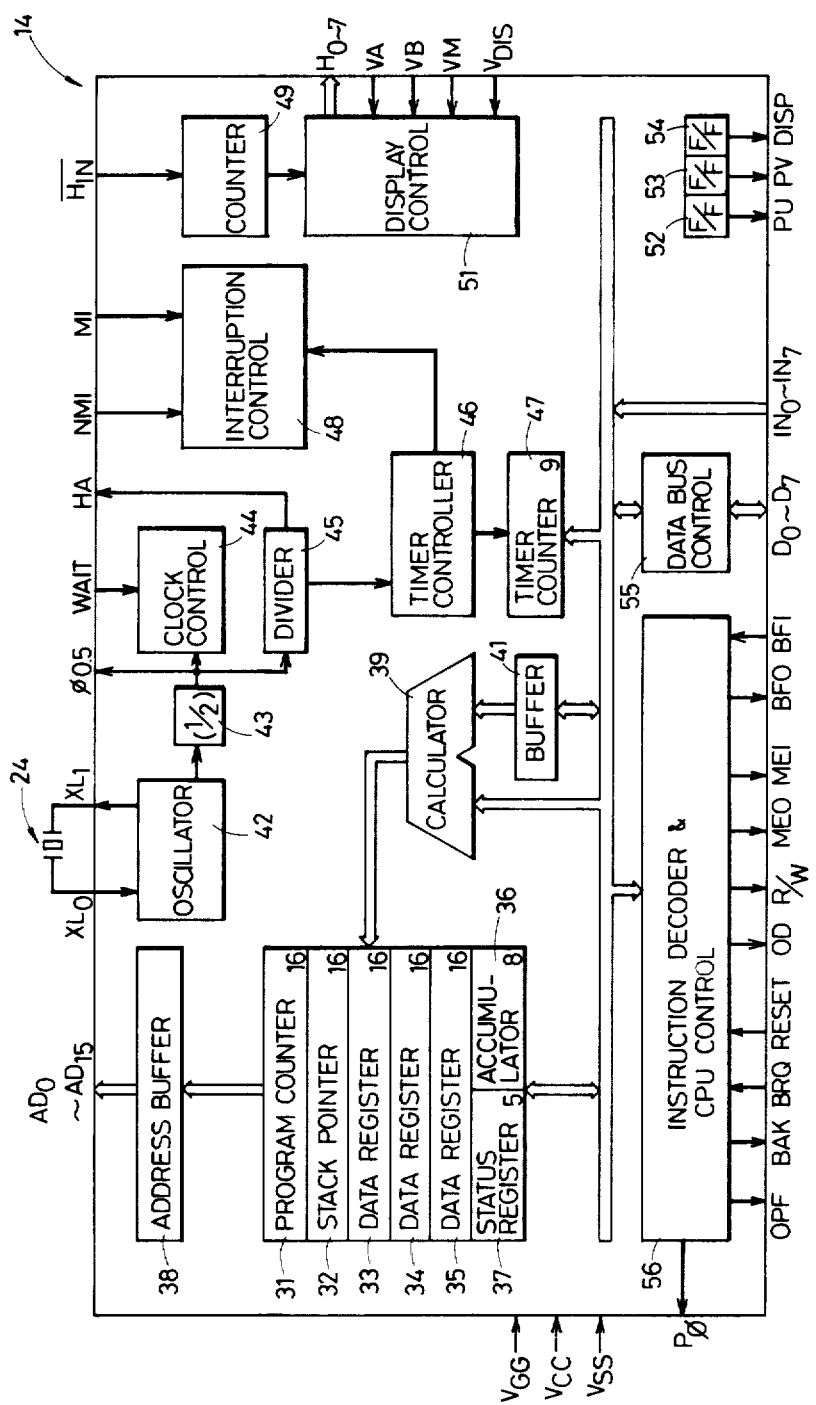
FIG. 3 is a block diagram of a microprocessor unit included in the programmable electronic calculator of FIGS. 1 and 2.

FIG. 3 shows a detailed construction of the microprocessor unit 14 of FIG. 2.

The microprocessor unit 14 includes a program counter 31 of 16-bit construction. The program counter 31 is a register of 16-bit construction, and functions to store the address data next to the command currently executed by the microprocessor unit 14. The contents stored in the program counter 31 are increased by one when the next command is fetched. A stack pointer 32 is a register of 16-bit construction, and functions to indicate the address of the stack which should be selected in the push-down operation or the pop-up operation of the memories. Data registers 33, 34 and 35 are registers of 16-bit construction. The data registers 33, 34 and 35 function not only as the data registers but also as the data pointers. An accumulator 36 functions to store the calculation results, and functions as a buffer register for conducting the data transfer between the outer memory and the main body of the programmable electronic calculator. A status register 37 memorizes various conditions such as a carry, borrow, zero and overflow in the arithmetic calculation operation.

An address buffer circuit 38 is connected to the address bus $AD_0$ through $AD_{15}$. The microprocessor unit 14 further includes an arithmetic calculation circuit 39 and a buffer circuit 41 for arithmetic calculation purposes.

An oscillator circuit 42 includes terminals $XL_0$ and $XL_1$ which are connected to the crystal oscillator 24. A frequency divider ($\frac{1}{2}$) 43 is connected to receive the output signal of the oscillator circuit 42, and an output signal of the frequency divider ($\frac{1}{2}$) 43 is applied to a clock control circuit 44. The clock control circuit 44 controls the development of the timing signals in response to a timing control signal (WAIT) applied thereto. Another frequency divider 45 is connected to receive the output signal of the frequency divider ($\frac{1}{2}$) 43. The output signal of the frequency divider 45 is applied to the display control circuit 11 as the synchronization signal HA. The output signal of the frequency divider 45 is also applied to a timer controller 46. The timer controller 46 controls the count operation and the interrupt operation of a timer counter 47. The timer counter 47 is a polynomial counter of 9-bit construction and functions to count a time interval for timer interruption.

An interruption control circuit 48 controls the interruption operation in accordance with the interruption request introduced through terminals NMI and MI and the signal developed from the timer controller 46. A counter 49 is provided for developing the back plate signal which is applied to the display panel 1. An input signal $H_{IN}$ of the counter 49 is normally connected to the synchronization signal HA. A display control circuit 51 receives display drive voltages $V_{DIS}$, $V_A$, $V_B$ and $V_M$, and develops the back plate signals $H_0$ through $H_7$. The microprocessor unit 14 further includes flip-flops 52 and 53 of the versatile use, a flip-flop 54 for controlling ON/OFF operation of the display, and a data bus control circuit 55.

Signals introduced through input ports $IN_0$ through $IN_7$ are introduced into and stored in the accumulator 36 as the eight-bit data. The data bus $D_0$ through $D_7$ transfer the data bidirectionally, thereby effecting the data writing operation into the outer memory or the data reading operation from the outer memory. An instruction decoder/CPU control circuit 56 is provided for controlling the system operation. The instruction decoder/CPU control circuit 56 develops various control signals such as a memory write control signal R/W, and memory enable signals $ME_0$ and $ME_1$.

Figure 4:
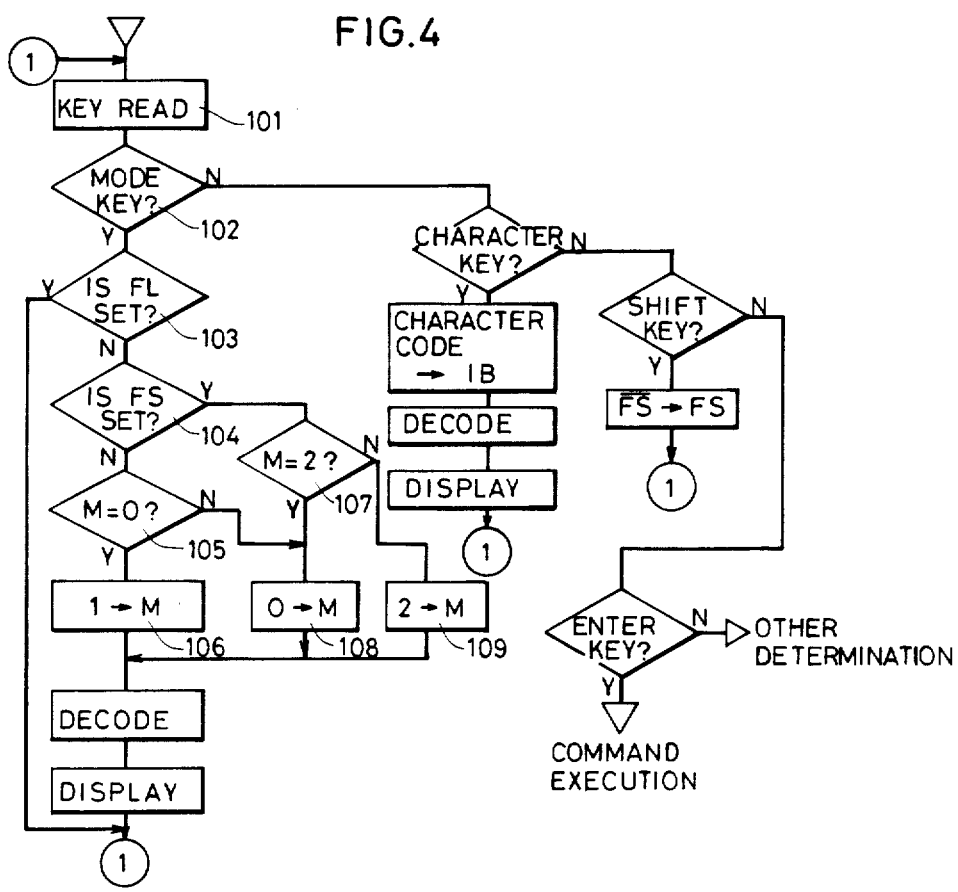
FIGS. 4, 5, 6 and 7 are flow charts for explaining operational modes of the programmable electronic calculator of FIGS. 1 and 2.

An operational mode of the programmable electronic calculator of the present invention will be described with reference to flow charts shown in FIGS. 4 through 7. In FIG. 4, M represents a data element comprising a counter for indicating a mode of operation, FL represents a flag indicating a locked condition, and FS represents a flag for indicating an actuated condition of the shift key. The counter M and the flags FL and FS are stored in a system area of the read/write memories (RAM) 15.

Key input information is read at a step 101. When the actuation of the mode selection key 2 is detected at a step 102, the operation is advanced to the following step 103 where the condition of the flag FL is detected. If the flag FL is in the set state, no operation is conducted so that the operational mode is not changed. More specifically, if the programmable electronic calculator is in the locked condition, the programmable electronic calculator will not be placed in the programming mode even though the mode selection key 2 is actuated.

If the reset state of the flag FL is detected at the step 103, the operation of steps 104 through 109 is conducted to change the mode of operation of the programmable electronic calculator. M=0 represents the run mode (normal operational mode), M=1 represents the programming mode and M=2 represents the reserve mode. In the run mode, the programmable electronic calculator executes the program which has been introduced into the programmable electronic calculator in response to a successive introduction of "RUN" command and "ENTER" command through the use of the character keys 5 and the enter key 6. Of course, in the run mode, the conventional calculation operation can be conducted. In the programming mode, a stored program can be modified, a stored program can be erased, or a new program can be introduced into the programmable electronic calculator. In the reserve mode, any desired key operation sequence can be assigned to any one of the reserve keys 7. For example, the "RUN" message can be assigned to the reserve key (&) 7. If the "RUN" message is assigned to the reserve key (&) 7 in the reserve mode, the "RUN" command can be introduced by the single actuation of the reserve key (&) 7 instead of the successive actuation of three character keys "R", "U" and "N".

It will be clear from the steps 104 through 109 that, if the shift key 4 is not actuated, namely when the flag FS is in the reset state, the mode is changed from M=0 to M=1, or from M=1 or M=2 to M=0. More specifically, if the mode selection key 2 is actuated under the condition where the flags FL and FS are in the reset state, the programmable electronic calculator is placed in the run mode in case the programmable electronic calculator has previously been in the programming mode or the reserve mode. If the programmable electronic calculator has previously been in the run mode, the programmable electronic calculator is placed in the programming mode.

If the mode selection key 2 is actuated immediately after the actuation of the shift key 4, the operation varies because the flag FS is in the set state. More specifically, if the mode selection key 2 is actuated under the condition where the flag FL is in the reset state and the flag FS is in the set state, the programmable electronic calculator is placed in the reserve mode when the programmable electronic calculator has previously been in the run mode or the programming mode. If the programmable electronic calculator has previously been in the reserve mode, the programmable electronic calculator is placed in the run mode.

Figure 5:
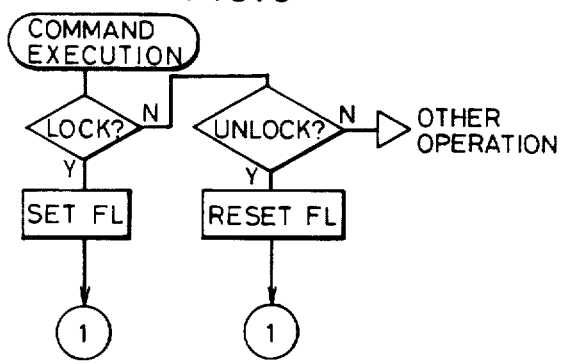

In order to preclude an unintentional erasure or change of the optional program stored in the read/write memories (RAM) 15, a "LOCK" command is introduced in the run mode through the use of the character keys 5 and the "ENTER" command is introduced through the enter key 6. When the "LOCK" command is introduced in the run mode, the flag FL is set as shown in FIG. 5. As already discussed above, when the flag FL is in the set state, the mode of operation (in the run mode) will not be changed even when the mode selection key 2 is erroneously actuated in the run mode. In order to release the locked condition, "UNLOCK" command is introduced through the use of the character keys 5 and the "ENTER" command is introduced through the enter key 6. When the "UNLOCK" command is introduced into the programmable electronic calculator, the flag FL is reset as shown in FIG. 5, thereby allowing the mode change in response to the actuation of the mode selection key 2.

In accordance with the above-mentioned embodiment, the mode selection key 2 is locked at a desired time in order to prevent the optional program stored in the read/write memories (RAM) 15 from being unintentionally modified or erased. The lock command is not necessarily introduced through the key input panel. The mode lock command can be incorporated in the program. For ,example, if the program is designed in the following manner (Table I), the mode selection key 2 is locked after the operation of the line number 20 is executed, and the mode selection key 2 is unlocked after execution of the line number 110.

TABLE I

| LINE NUMBER | STATEMENT |
| --- | --- |
| . | . |
| . | . |

TABLE I-continued

| LINE NUMBER | STATEMENT |
| --- | --- |
| . | . |
| . | . |
| 10 | PRINT A |
| 20 | LOCK |
| 30 | INPUT X |
| . | . |
| . | . |
| 110 | UNLOCK |
| . | . |
| . | . |

Figure 6:
Figure 7:
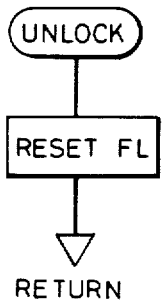

In response to the lock statement at the line number 20, the flag FL is set as shown in FIG. 6. The locked condition is maintained until the unlock statement is executed at the line number 110 to reset the flag FL as shown in FIG. 7. That is, the lock condition of the mode selection key 2 is controllable even when a certain program is being executed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A programmable electronic calculator comprising:
microprocessor means for controlling operation of said calculator in a programming mode, in which mode program instructions are input to said calculator, and in at least one additional operational mode;
storage means operatively associated with said microprocessor means for storing program instructions input during said programming mode;
key input means operatively associated with said microprocessor means and said storage means for inputting and storing program instructions in said storage means in said programming mode;
mode selection means operatively associated with said input means for selectively placing said calculator in said programming mode of operation and said at least one additional operational mode; and
locking means operatively associated with said mode selection means for selectively inhibiting operation of said mode selection means, for preventing said calculator from being placed in said programming mode, and for preventing alteration of program instructions stored in said storage means.

2. The programmable electronic calculator of claim 1, wherein said storage means is a read/write memory and said locking means prevents alteration of program instructions in said memory via said key input means.

3. The programmable electronic calculator of claim 1, wherein said locking means comprises a switch operatively associated with said key input means.

4. The programmable electronic calculator of claim 1, wherein said locking means is responsive to a command within a program executed by said calculator in said at least one additional operational mode.

5. The programmable electronic calculator of claim 1, wherein said locking means comprises a flag for indicating to said microprocessor means whether said locking means is in a locked or an unlocked condition.

* * * * *